(12) United States Patent
Aas et al.

(10) Patent No.: US 7,843,495 B2
(45) Date of Patent: Nov. 30, 2010

(54) FACE RECOGNITION IN A DIGITAL IMAGING SYSTEM ACCESSING A DATABASE OF PEOPLE

(75) Inventors: Eric F. Aas, Windsor, CO (US); Larry S. Chapman, Fort Collins, CO (US); Charles E. Schinner, Windsor, CO (US); Robert Cazier, Fort Collins, CO (US); Theodore B. Ziemkowski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1320 days.

(21) Appl. No.: 10/193,030

(22) Filed: Jul. 10, 2002

(65) Prior Publication Data

US 2004/0008258 A1    Jan. 15, 2004

(51) Int. Cl.
 H04N 5/76 (2006.01)
 G06K 9/00 (2006.01)
(52) U.S. Cl. .................................. 348/231.3; 382/118
(58) Field of Classification Search ............ 348/231.99, 348/231.2, 231.3, 231.5; 382/115, 118
See application file for complete search history.

(56) References Cited

U.S. PATENT DOCUMENTS

| | | | |
|---|---|---|---|
| 5,164,992 A | 11/1992 | Turk et al. | |
| 6,035,055 A * | 3/2000 | Wang et al. | 382/118 |
| 6,038,333 A | 3/2000 | Wang | |
| 6,184,926 B1 | 2/2001 | Khosravi et al. | |
| 6,549,913 B1 | 4/2003 | Murakawa | |
| 6,606,398 B2 * | 8/2003 | Cooper | 382/118 |
| 6,721,001 B1 * | 4/2004 | Berstis | 348/231.3 |
| 6,833,865 B1 * | 12/2004 | Fuller et al. | 348/231.2 |
| 2001/0040986 A1 | 11/2001 | Farringdon et al. | |
| 2001/0043727 A1 | 11/2001 | Cooper | |
| 2002/0080256 A1 * | 6/2002 | Bates et al. | 348/335 |
| 2002/0101519 A1 * | 8/2002 | Myers | 348/232 |
| 2003/0174215 A1 * | 9/2003 | Goldsmith | 348/222.1 |
| 2004/0008258 A1 | 1/2004 | Aas et al. | |
| 2004/0008906 A1 * | 1/2004 | Webb | 382/306 |
| 2004/0243671 A9 | 12/2004 | Needham et al. | |

FOREIGN PATENT DOCUMENTS

| | | |
|---|---|---|
| JP | 07271851 | 10/1995 |
| JP | 10232934 | 9/1998 |
| JP | 11261827 | 9/1999 |
| JP | 2000076459 | 3/2000 |
| JP | 2000331167 | 11/2000 |
| JP | 2001216515 | 8/2001 |

(Continued)

OTHER PUBLICATIONS

Definition of "metadata", The IEEE Standard Dictionary of Electrical and Electronics Terms, Sixth Edition, 1996, p. 648.*

(Continued)

*Primary Examiner*—Timothy J Henn

(57) ABSTRACT

In a method and apparatus for building up a database of known faces, the database of known faces allows the names of the people captured in an image to be added to the meta-data of the image file. The digital imaging device will ask the user to identify unknown people captured in an image.

24 Claims, 3 Drawing Sheets

FOREIGN PATENT DOCUMENTS

| JP | 2001-309225 | 11/2001 |
|----|-------------|---------|
| JP | 2002-152696 | 5/2002 |
| JP | 2002-044596 | 8/2002 |

OTHER PUBLICATIONS

Japanese Patent Application 2003-154371, Office Action dated Jun. 2, 2009.
Satoh, et al. Name-it: Naming and Detecting Faces in News Videos, Jan.-Mar. 1999, IEEE Multimedia, vol. 6, Issue 1, p. 17.
Non Final Office Action, dated Mar. 20, 2006, U.S. Appl. No. 10/192,922, 12 pages.
Final Office Action, dated May 23, 2006, U.S. Appl. No. 10/192,922, 10 pages.
Non Final Office Action, dated Apr. 6, 2010, U.S. Appl. No. 10/192,922, 10 pages.
Examiner Answer, dated Aug. 24, 2006, U.S. Appl. No. 10/192,922, 19 pages.
Restriction Requirement, dated Jan. 5, 2010, U.S. Appl. No. 10/192,922, 7 pages.

* cited by examiner

FACE RECOGNITION IN A DIGITAL IMAGING SYSTEM ACCESSING A DATABASE OF PEOPLE

RELATED APPLICATIONS

This application is related to the application "File management of digital images using the names of people identified in the image" and was filed on the same day as this application.

FIELD OF THE INVENTION

The field of this invention relates to digital imaging systems and more specifically to face recognition in a digital imaging system accessing a database of face information.

BACKGROUND OF THE INVENTION

Digital imaging systems create a large number of files. These files can be audio files, thumbnails or full digital images. Many of these files are images containing people. The user of the imaging system may know the names of the people in the pictures they captured. But other people shown the pictures may not know the names of the people in the images. The user may also forget the names of the people in the images over time.

There is a need for an imaging system that can recognize people and store the names of the people in images captured by the imaging system.

SUMMARY OF THE INVENTION

A digital imaging system that can create and maintain a database of people contained in images can simplify the identification of people in images. The digital imaging system also adds the names of the people in the images captured, to the meta-data of the image.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
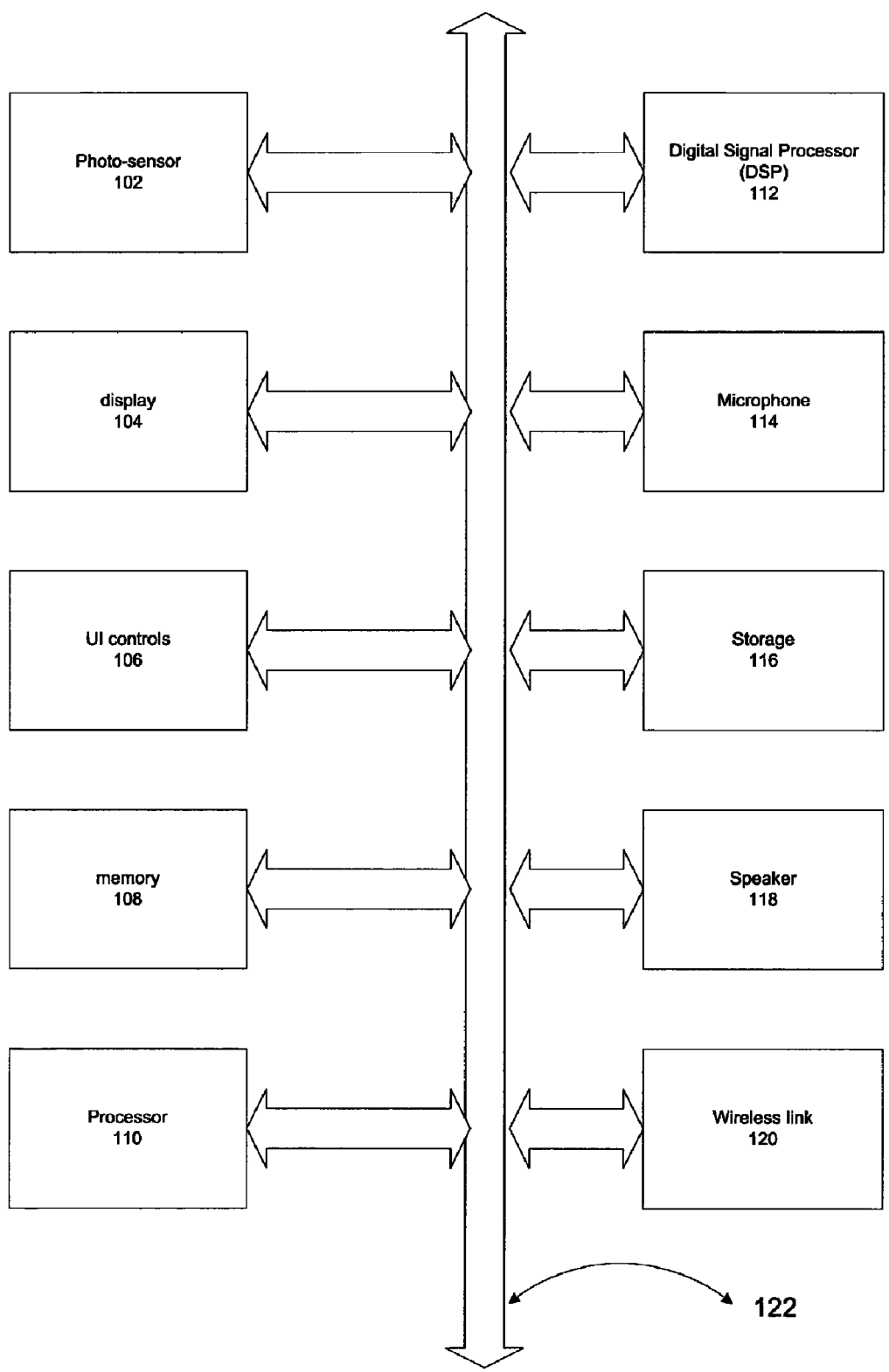
FIG. 1 is a block diagram of a digital imaging system in accordance with an example embodiment of the present invention.
Figure 2:
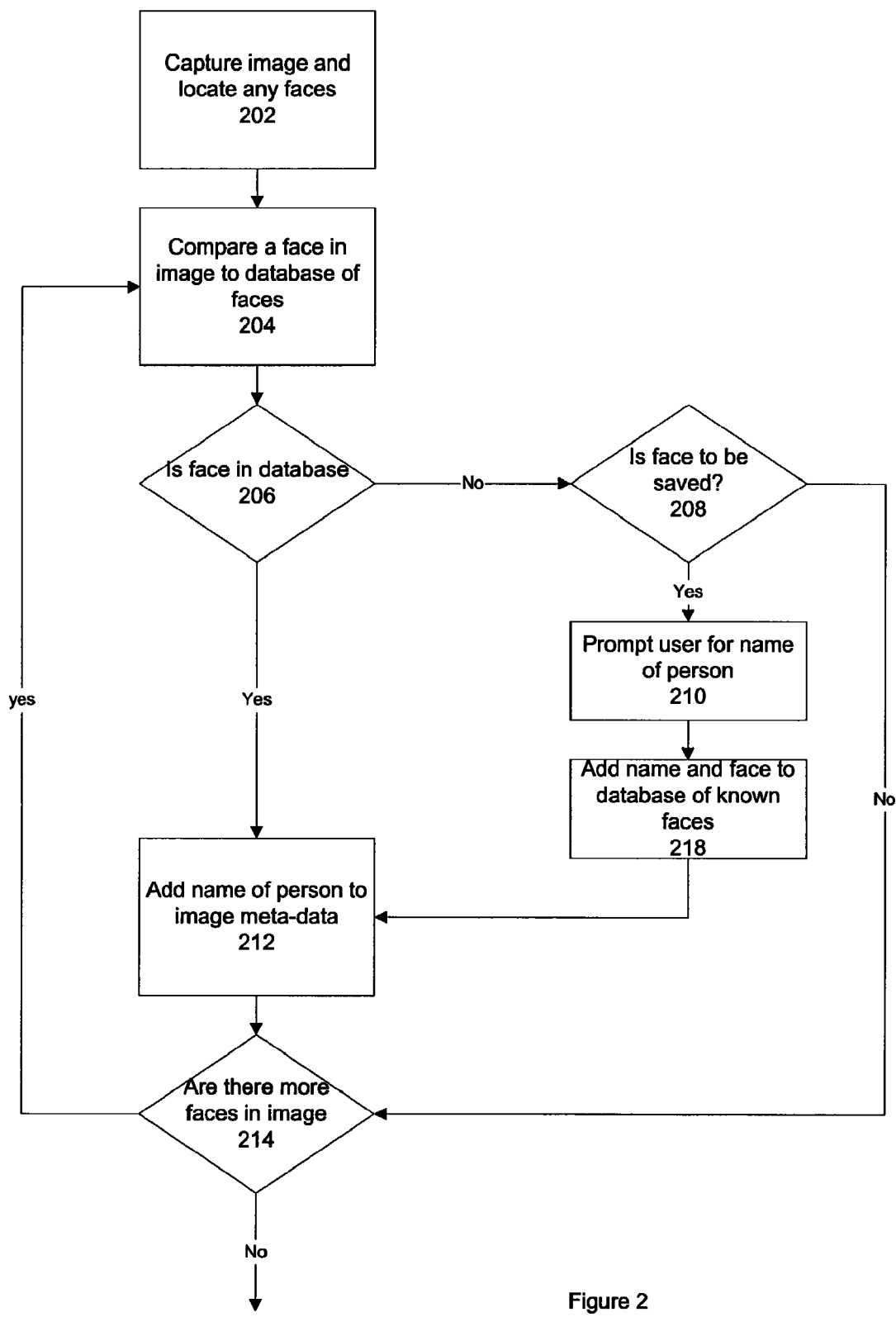
FIG. 2 is a flow chart for creating a database of faces contained in images in accordance with an example embodiment of the present invention.
Figure 3:
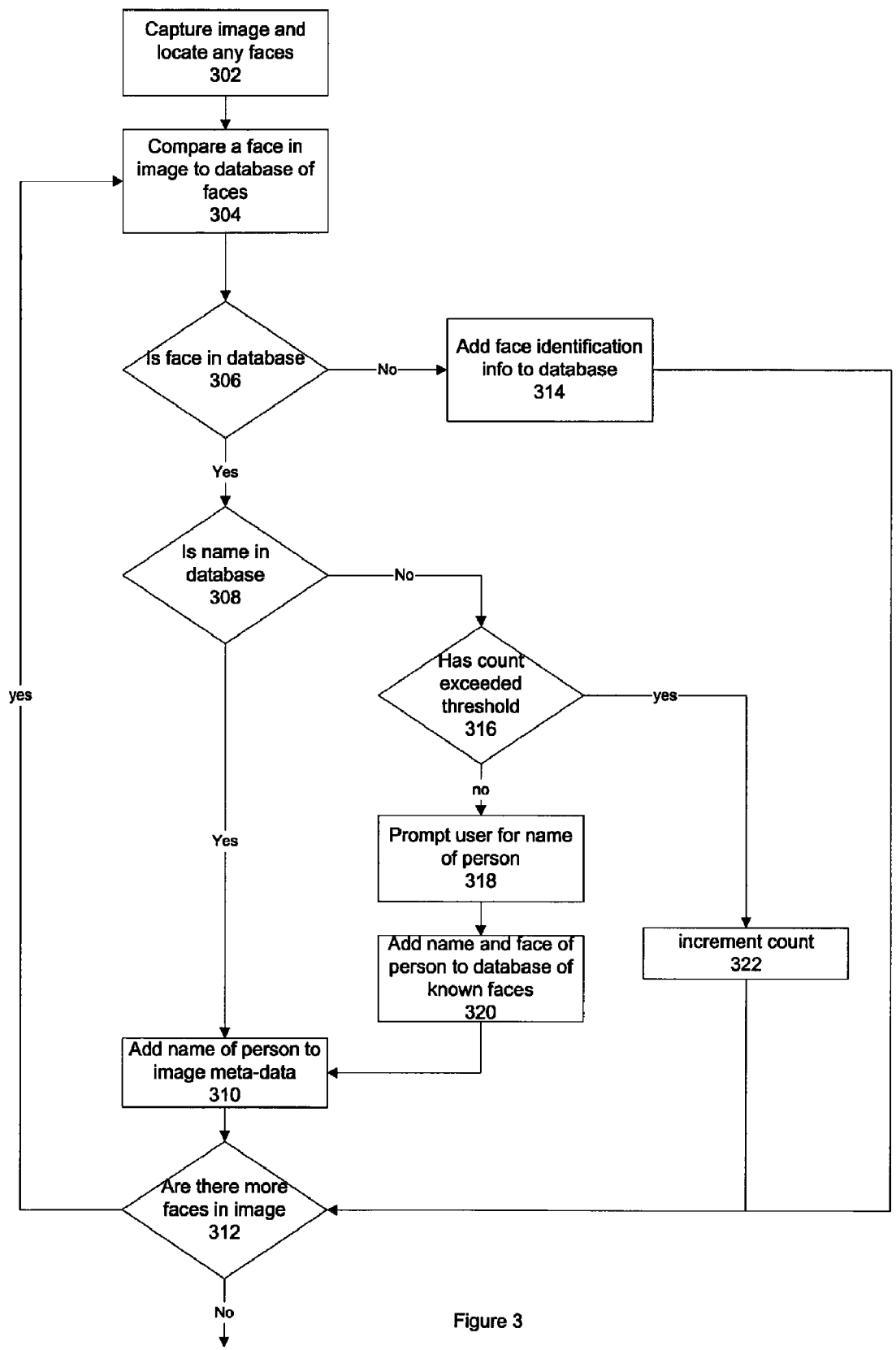
FIG. 3 is a flow chart for creating a database of faces contained in images in another example embodiment of the present invention.

A system that can build a database of people captured in images can facilitate the organization and management of those images.

Today there are a number of methods that can be used to detect a human face inside a digital image. U.S. Pat. No. 6,184,926 B1 "System and method for detecting a human face in uncontrolled environments" is one example and is hereby included by reference for all that it teaches. Once a human face has been identified inside a digital image, information about that face can be extracted such that the face can be identified in other images. For example U.S. Pat. No. 5,164,992 "Face recognition system", hereby included by reference, can compare faces in digital images to a set of reference faces to determine if any of the reference faces are present in the digital image.

Digital cameras today typically contain a photo-sensor (102) for capturing images; a display area (104) for displaying the captured images and controlling the digital camera; a storage area (116) for storing the captured images; memory (108), for temporary manipulation of the captured images and for running the firmware of the camera; a processor (110) for running the camera and some type of user interface (UI) controls (106). Some digital cameras also include a microphone (114) for capturing audio clips along with the digital images. Some digital cameras include a speaker (118) and a digital signal processor (DSP 112). The UI controls (106) on digital cameras may include physical controls like buttons, rocker switches, and a keyboard, and virtual controls shown in the display area. The digital images, video clips and audio clips captured by the digital camera may be stored in memory (108) or may be moved to the storage area (116). Today the memory and the storage area are typically different types of devices. The memory is typically fast volatile memory and the storage area is typically slower non-volatile memory. In the future, as the speed of non-volatile memory increases, all the memory may be of the non-volatile type. Digital cameras may also contain a wireless link (120) to the Internet, for example a cell phone.

An image file typically contains more information than just the raw image data. This additional data is typically called meta-data. Most image files also contain the time and date the file was created. Many image files also contain information about the image, for example the resolution of the image, the exposure settings used to capture the image, whether the image has been compressed, and if so how much compression was used. Some cameras contain global positioning systems (GPS, not shown) and include, in the image file, the location the file was created. There are many other types of information that can be included in an image file, for example the names of the people captured in the image may be stored as meta-data.

In one embodiment of the current invention, a digital camera would have access to a database of known faces. The face database may be contained in the memory (108) or storage area (116) of the camera and accessed using the internal bus (122) or the face database may be accessed remotely through a wireless link (for example a cell phone or a radio link). The remote database could also be accessed using an IR link or a cable link (Not shown), for example USB or SCSI. The database of faces would comprise at least the face identification information for a person and the name of the person. The digital camera would first capture an image (202). The image could be a single exposure or it could be a single frame from a video clip. The digital camera would evaluate the image to determine if any human faces were contained in the captured image (202). If there were human faces detected in the image, the camera would extract the face identifying information from each human face. The camera would then compare the face identifying information with the database of known faces (204). Alternatively, the processing of the image to locate faces and extract the face identification information may be done remotely (not shown). If a face in the image is already in the face database, the name of the person recognized in the image would be added to the meta-data for that image (212). If a face in the image was not already in the database, the user may optionally be asked if the face is to be saved (208). If the face is not to be saved the next face in the image is compared to the database of known faces. If the face is to be saved, the user is prompted to input the person's name (210). The name of the person and the face identification information is added to the database of known faces (218) and the name of the person is added to the meta-data of the image (212).

In another embodiment of the current invention, the user is not prompted to name a person until the person's face has appeared in a preset number of captured images. When a face in an image is not in the database of known faces, the face identifying information is automatically added to the database (314). Each time the face identification information is detected in another image a count is incremented (322). When the count exceeds a predetermined number, the user is then prompted to name the person (318). Once a person in the database of known faces has been named, the name of the person is added to the meta-data of any images containing that person's face (310). The user may adjust the number of times a face needs to appear in an image before the user is prompted to name the person. The user may decide that the person should not be named, even when the face has appeared in the preset number of images.

The digital camera can prompt the user to name a person in a number of ways. The digital camera can display the captured image in the display area and indicate the person to be named. A cursor can be placed below or next to the person to be named to indicate which person in the images needs to be named. An outline can be drawn around the person to be named or a shape can be drawn around the person to be named, for example a box, circle, or oval can be used. The user may name the person using the UI controls or may name the person verbally by speaking the person's name.

In one embodiment of the current invention, the database of known faces is empty when the user buys the camera. The database is built up as the user captures images with people in them and names the people in the images. In another embodiment a new camera is updated with a database of known faces from an older camera when the user purchases the new camera. In another embodiment of the current invention, the database of known faces is not stored in the camera and the link to the database is transferred from an old camera to the new camera when the user buys a new camera. When the database of known faces is not contained in the camera, multiple cameras may link to the same database, for example when two people in the same family have two cameras, both cameras may be linked to the same database of known faces. In another embodiment of the current invention, a face database is maintained locally, and multiple cameras in the local area are allowed access to the local face database. For example, if you were at someone's house that contained a local database, the faces of the people in the house would be available for identification in your pictures.

Once the name of the person has been added to the meta-data of the image containing the person, that information can be used to help organize or sort the large number of images created. For example, a user could create a list of all the images that contain "Eric Aas" by sorting the images using the meta-data.

In another embodiment of the current invention, the image file captured is named using the name of the people contained in the image. For example, when "Steven Webb's" face is identified in an image, the image could be named Stevenwebb01.jpg. In another embodiment of the current invention, a folder or subdirectory would be created for people identified in the images and each image containing those people would be moved or stored in that sub-directory. For example, all the images containing the face of "Steven Webb" would be moved or stored in the directory named StevenWebb. When an image contains multiple people stored in the database of known faces, a copy of the image could be stored in a directory for each person. Or the image could be stored in only one of the directories with a link to the stored image stored in each of the other directories.

In this application the descriptions of the embodiments used a digital camera to capture the image. This invention is not limited to a digital camera. A scanner that creates digital images from hardcopy images can also use the current invention. In fact any device that creates or capture images in digital form can also use the current invention, for example a web cam.

The foregoing description of the present invention has been presented for purposes of illustration and description. It is not intended to be exhaustive or to limit the invention to the precise form disclosed, and other modifications and variations may be possible in light of the above teachings. For example, this invention is not limited to digital imaging devices, this invention can be used to help name a file created in any manner. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital camera comprising:
   a photo-sensor configured to capture images;
   a means for accessing a face database, the face database used for storing the names and the face identification information for people;
   a processor configured to evaluate captured images to locate faces;
   the processor configured to match the faces, located by the processor, to the face identification information stored in the face database;
   a means for communicating with a user;
   the camera configured to request a name of a person, using the communication means, when a face of the person in an image does not match any faces currently stored in the face database and a count incremented each time face identification information is detected in another image exceeds a predetermined number; and
   where the name of the person is added to the meta-data of the image containing the person when the user identifies the person, the meta-data contained in the same image file as image data for the image.

2. The digital camera of claim 1 where the name of the person and the face identification information is added to the face database when the user identifies the person.

3. The digital camera of claim 1 where the name of a person is added to the image meta-data when a face in an image matches a face in the face database.

4. The digital camera of claim 1 where the face database is stored in the camera.

5. The digital camera of claim 1 where the face database is stored externally from the camera.

6. A digital camera comprising:
   a photo-sensor configured to capture images;
   access to a face database, the face database for storing the names and the face identification information for people;
   a processor configured to evaluate captured images to locate faces, the processor configured to match the faces, located by the processor, to the face identification information stored in the face database;

the processor configured to add the face identification information to the face database when a face of a person does not match any faces currently stored in the face database;

a means for communicating with a user; and the camera configured to request a name of a person, using the communication means, based on a count being incremented each time face identification information is detected in another image and prompting the user to name the person when the count exceeds the predetermined number.

7. The digital camera of claim 6 further comprising:
the processor configured to add the name of the person to the face database.

8. The digital camera of claim 7 where the predetermined number of images is set by a user.

9. The digital camera of claim 7 where the name of the person is added to the meta-data of the image containing the person.

10. A method of identifying people in images, comprising:
capturing an image;
locating at least one face in the image;
comparing the at least one face in the image to a database of known faces;
requesting a name for the face when the face does not match any of the known faces in the database based on a count being incremented each time face identification information is detected in another image and prompting the user to name the person when the count exceeds the predetermined number;
storing the face and the name in the database of known faces; and
adding the name of the person to captured image meta-data.

11. A method of identifying people in images, comprising:
capturing an image;
locating at least one face in the image;
comparing the at least one face in the image to a database of known faces;
adding the name of the person to the captured image meta-data when the face matches a face in the face database, the meta-data contained in the same image file as image data for the image; and
requesting a name for the face when the face does not match a face in the face database and a count incremented each time face identification information is detected in another image exceeds the predetermined number.

12. A method of identifying people in images, comprising:
capturing an image;
locating at least one face in the image;
comparing the at least one face in the image to a database of known faces;
storing the face in the database of known faces when the face does not match any faces in the database of known faces; and
requesting the name of a person when the person has appeared in a predetermined number of images, said predetermined number being greater than one, based on a count being incremented each time face identification information is detected in another image and prompting a user to name the person when the count exceeds the predetermined number.

13. The method of claim 12 further comprising:
adding the name of the person to the face database.

14. The method of claim 12 further comprising: adding the name of the person to the meta-data of the captured image.

15. A method of creating a database of known faces, comprising:
capturing an image;
locating at least one face in the image;
comparing the face to the faces in the database of known faces;
notifying a user that the image contains an unidentified face when the face does not match any of the faces in the database of known faces;
requesting a name for the face when the user designates that the face is to be added to the database of known faces based on a count being incremented each time face identification information is detected in another image and prompting the user to name the person when the count exceeds the predetermined number;
storing the face and the name in the database of known faces; and
adding the name of the person to the meta-data of the captured image when the user designates that the face is to be added to the database of known faces.

16. A digital camera comprising:
a photo-sensor configured to capture images;
a display configured to display the captured images;
a means for designating a face in a captured image;
an input device configured to allow entry of a name associated with the face;
a processor configured to extract the face identification information from the designated face in the captured image;
a face database for storing the names and the face identification information;
where the name is added to the meta-data of the captured image, the meta-data contained in the same image file as image data for the image; and
where a name is requested when the face does not match a face in the face database and when a count incremented each time face identification information is detected in another image exceeds a predetermined number.

17. The digital camera of claim 16 where the input device is a microphone.

18. The digital camera of claim 16 where the input device is a 4 way rocker switch.

19. A method of identifying people in images, comprising:
digitizing an image;
locating at least one face in the image;
comparing the at least one face in the image to a database of known faces;
requesting a name for the face when the face does not match any of the known faces in the database based on a count being incremented each time face identification information is detected in another image and prompting the user to name the person when the count exceeds the predetermined number;
storing the face and the name in the database of known faces; and
adding the name of the person to the digitized image meta-data.

20. A method of identifying people in images, comprising:
digitizing an image;
locating at least one face in the image;
comparing the at least one face in the image to a database of known faces;

adding the name of the person to the digitized image meta-data when the face matches a face in the face database, the meta-data contained in the same image file as image data for the image; and requesting the name of the person when the face does not match a face in the database of known faces and when a count incremented each time face identification information is detected in another image exceeds a predetermined number.

21. A method of identifying people in images, comprising:

digitizing an image;

locating at least one face in the image;

comparing the at least one face in the image to a database of known faces;

storing the face in the database of known faces when the face does not match any faces in the database of known faces; and requesting the name of a person when the person has appeared in a predetermined number of images, based on a count being incremented each time face identification information is detected in another image and prompting the user to name the person when the count exceeds the predetermined number.

22. The method of claim 21 further comprising:

adding the name of the person to the face database.

23. The method of claim 21 further comprising: adding the name of the person to the meta-data of the digitized image.

24. A method of creating a database of known faces, comprising:

digitizing an image;

locating at least one face in the image;

comparing the face to the faces in the database of known faces;

notifying a user that the image contains an unidentified face when the face does not match any of the faces in the database of known faces;

requesting a name for the face when the user designates that the face is to be added to the database of known faces based on a count being incremented each time face identification information is detected in another image and prompting the user to name the person when the count exceeds the predetermined number;

storing the face and the name in the database of known faces; and adding the name of the person to the meta-data of the digitized image when the user designates that the face is to be added to the database of known faces.

* * * * *

UNITED STATES PATENT AND TRADEMARK OFFICE
CERTIFICATE OF CORRECTION

PATENT NO. : 7,843,495 B2  
APPLICATION NO. : 10/193030  
DATED : November 30, 2010  
INVENTOR(S) : Eric F. Aas et al.

It is certified that error appears in the above-identified patent and that said Letters Patent is hereby corrected as shown below:

In column 5, line 36, in Claim 10, after "to" insert -- the --.

In column 5, line 50, in Claim 11, delete "the" and insert -- a --, therefor.

Signed and Sealed this
Twenty-first Day of February, 2012

David J. Kappos
*Director of the United States Patent and Trademark Office*